March 29, 1949. S. I. STRICKHOUSER ET AL 2,465,493
EMBOSSED BATTERY SEPARATOR
Filed Dec. 5, 1944 2 Sheets-Sheet 1
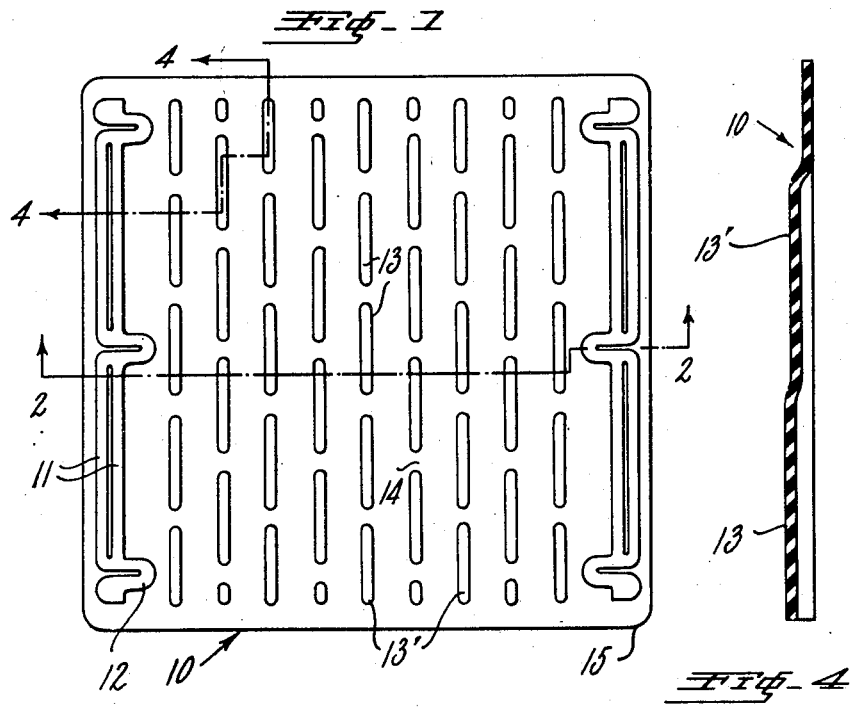
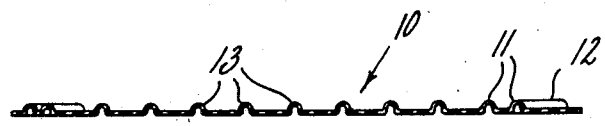
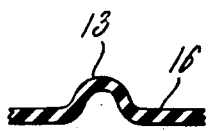
INVENTORS
SHERMAN I. STRICKHOUSER
EDWIN C. UHLIG
BY
ATTORNEY

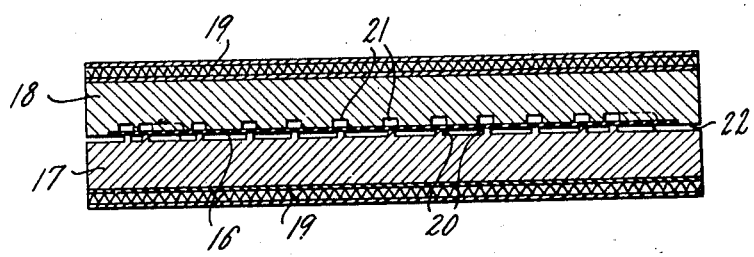
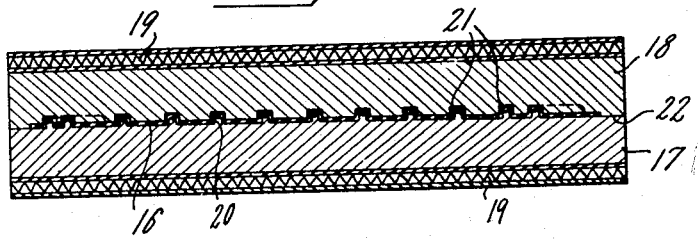
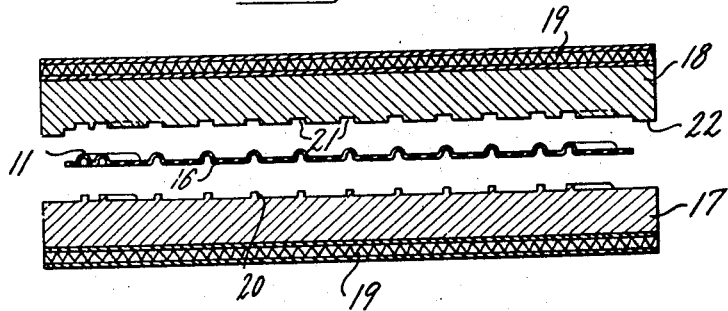

Patented Mar. 29, 1949

2,465,493

UNITED STATES PATENT OFFICE 2,465,493

EMBOSSED BATTERY SEPARATOR

Sherman I. Strickhouser, Edgewood, and Edwin C. Uhlig, Greenwood, R. I., assignors to United States Rubber Company, New York, N. Y., a corporation of New Jersey Application December 5, 1944, Serial No. 566,712

7 Claims. (Cl. 136—145)

This invention relates to battery separators of microporous vulcanized hard rubber or other microporous plastic composition.

This application is a continuation-in-part of our prior application Serial No. 501,984, filed September 11, 1943, which has been abandoned.

Thin porous separators made of non-conducting material with sufficient mechanical strength for convenient handling are placed between alternating positive and negative plates in storage battery cells to prevent metallic conduction between the plates of opposite polarity while freely permitting electrolytic conduction.

These separators preferably are made as thin as is consistent with adequate strength and insulating properties and are provided on the face exposed to the positive plate with raised ribs that stiffen the separator and provide greater opportunity for circulation of the electrolyte at the face of the positive plate.

Separators, when soaked in storage battery electrolyte, should have as low resistance to electrolytic conduction as it is possible to secure and at the same time afford adequate protection against metallic conduction between the plates, since the lower the resistance to electrolytic conduction the better the battery will perform.

A type of battery separator extensively used in recent years is formed of a microporous hard rubber plate having a flat, smooth surface upon one face and raised ribs upon its other face. This separator has been manufactured by producing an unvulcanized sheet having ribs upon one face thereof and then vulcanizing the ribbed sheet, but it is difficult to vulcanize the sheet after the ribs are formed without flattening or otherwise distorting the ribs, unless a temporary or permanent support is provided to protect the ribs during vulcanization.

While separators constructed in the manner just described and having thin web areas and thick rib areas are extensively used, the ribs increase the resistance to electrolytic conduction, and the operation above referred to for protecting the ribs during vulcanization adds considerably to the cost of manufacturing the separators. Furthermore, such separators when finished frequently have to be ground to bring them accurately to the required overall thickness.

The present invention contemplates an extremely simple and practicable construction for microporous battery separators that have pronounced advantages over the prior separators above described and which can be made more economically than such prior constructions.

One important object of the present invention is to provide separators of microporous vulcanized hard rubber or heat-softenable microporous plastic composition, or other fairly rigid microporous plastic material suitable for battery separator construction and having stiffening ribs upon one face, but which separators are so constructed that the rib areas have as low resistance to electrolytic conduction as the flat web areas of the separators. Such a construction is secured by forming the separator with raised ribs upon one face and corresponding depressions upon the opposite face. This construction permits good circulation of the battery electrolyte at the faces of both the positive and negative plates.

Another important object of the present invention is to improve the construction of such battery separators whereby they may be made more uniform in overall thickness than heretofore and more economically than the microporous ribbed separators provided heretofore.

Another object of the present invention is to provide battery separators that will be slightly resilient under lateral compression so that they will fit snugly between the battery plates and prevent the separators and plates from vibrating within a battery during its normal use. Another object is to so construct the separator ribs that the ends of the separators may be easily stuffed in place between the negative and positive plates of a battery cell. Another object is to form a separator so that the ribs are omitted from adjacent to the ends of the separator so as to lessen the tendency of the ends to crack; and to round the corners of the separator so as to reduce their tendency to chip or crack.

When hard rubber or other plastic materials such as herein contemplated are heated, while being subjected to a constant applied load, a temperature is reached at which such material tends to lose its rigidity and permits slight bending under such load, the temperature at which this occurs is called the "softening temperature" or the "softening point" and is easily determined by using an A S T M test. As the temperature increases further the material becomes much softer and its ability to resist deformation under stress decreases rapidly. This temperature above the softening point at which the material is sufficiently softened to yield quickly without rupturing is usually referred to as the "yield temperature" and will be so referred to hereinafter.

In order to produce the battery separators of the present invention a heat-softenable microporous sheet of plastic composition is heated to a point between its yield temperature and fusing temperature, and while so heated the sheet is subjected to an embossing operation that produces raised ribs upon one face of the sheet and corresponding identations at the other face of the sheet.

Battery separators having the construction contemplated by the present invention can be produced not only by the sheet embossing operation just mentioned, but also by a molding operation carried out by introducing into a suitable mold a heat-hardenable or heat softenable material in the form of a batt of plastic filaments, or a shapeless mass of such material containing a pore-forming agent, or small plastic particles of such material in sufficient volume to allow formation of a sintered product. The finished separator contemplated by the present invention should have a porosity greater than 40% and a yield temperature above 100° F.

The above and other objects of the present invention will be more fully understood from the following description when read in connection with the accompanying drawings, in which:

Fig. 1 is a plan view of a finished embossed battery separator constructed in accordance with the present invention;

Fig. 2 is a section taken on the line 2—2 of Fig. 1;

Fig. 3 is an enlarged but similar section of one of the ribs shown in Fig. 2;

Fig. 4 is an enlarged section taken on the line 4—4 of Fig. 1;

Fig. 5 is a transverse section through an embossing mold shown slightly open and with the sheet that is to be embossed in the mold;

Fig. 6 is a similar view showing the mold closed with the sheet embossed therein; and Fig. 7 is a view similar to Fig. 5 showing the mold open and the embossed sheet lying in spaced relation between the mold plates.

The battery separator herein contemplated is provided with ribs adapted to supply added strength and to space the separator from the positive plate, and these ribs are so formed that the thickness of the sheet material of the separator in the rib areas is not greater than that of the web areas, with the result that the electrolytic conduction is very nearly uniform throughout all parts of the separator. The ribs may be given various sizes and shapes and in the present construction vertical rows of short ribs are provided throughout the major portion of the separator, since short aligned ribs separated by small flat web areas give better resistance to deformation than long continuous ribs. Also the ends of some of these short ribs are disposed in staggered relation to each other in the body portion of the separator, and all ribs terminate short of the upper and lower ends of the separator. The ribs at the marginal side edges of the separator are preferably made continuous to lessen the tendency of the electrolyte to flow laterally beyond the battery plates.

Now referring to the drawings and more particularly to Fig. 1, there is shown a battery separator 10 formed of microporous vulcanized hard rubber or other microporous plastic material and which is provided near its side marginal edges with relatively wide ribs formed of the two closely spaced ribs 11 the ends of which are connected to the off-set looped portions 12. In this manner a continuous rib or double rib is provided at each side of the separator which serves to stiffen a relatively wide marginal portion of the separator where each side extends beyond the side edges of the adjacent positive and negative plates.

The portion of the separator lying between the ribs 11 is provided with spaced vertical rows formed of short ribs 13 disposed in spaced relation to each other so that small flat web portions 14 are provided between the adjacent ends of the aligned ribs 13. These portions 14 help to prevent the entire separator sheet from spreading laterally when pressure is exerted against the ribs.

A highly desirable feature of the present separator resides in the construction whereby all ribs terminate short of the upper and lower ends of the separator as shown in Fig. 1 so that a flat margin is provided at each end of the separator that is less likely to break, and the corners 15 of the separators are preferably rounded as shown so that these corners will be less likely to chip off.

Another highly desirable feature of the present separator resides in the construction whereby the ribs near each end of the separator are made slightly lower than the rest of the ribs 13 as indicated by 13' in Fig. 4 so that the over all thickness of the separators will be reduced slightly near each end. The purpose of this is to facilitate the introduction of these separators in place between the positive and negative plates of a battery in making up an assembly of plates and separators to be placed in a battery cell. The positive plates provided in a battery cell are all secured to a cross strap and the negative plates for such cell are all secured to a second cross strap. After these positive and negative plates have been assembled in alternate relation they may be sprung apart somewhat in fanned relation to receive the separators. By making the ribs 13' lower or tapered the separators can be easily stuffed in between the plates, whereupon the plates and separators can be pressed together for insertion into the usual battery cell.

The battery separator shown in Fig. 1 is preferably formed by providing a flat, smooth sheet of microporous vulcanized hard rubber or other heat-softenable microporous plastic material having a yield temperature above 100° F. and indicated by 16 in Fig. 5 of the drawing. The sheet 16 is preferably heated to slightly above its yield temperature, which will vary for different stocks. This is preferably done by placing the sheet 16 in hot water say at a temperature of 200° F. for a sheet having a yield temperature of approximately 160° F. and after remaining in this bath say for some minutes, it is placed while hot and wet in the position shown in Fig. 5 between the male and female molding plates 17 and 18 of the mold, which molding plates are preferably heated say to a temperature of 170° F. for a sheet having the yield temperature just mentioned. The molding plates may be conveniently maintained at this temperature by providing each of the plates 17 and 18 with an electrical heating coil 19. The lower plate 17 is provided with the embossing ribs 20 and the upper plate 18 is provided with the correspondingly shaped depressions 21. In the construction shown the ribs 20 and depressions 21 have sharp angles in cross-section, but the sheet 16 when embossed by these ribs will be provided with the rounded ribs 13 due to the clearance space between the ribs 20 and depressions 21. The ribs 20 and depressions 21 may, if desired, be given the rounded contour of the rib 13.

The mold of Fig. 5 having the construction just described and having the sheet 16 therein is closed under pressure for a short period, say thirty seconds, to emboss the softened sheet 16 with the ribs as shown in Fig. 6, but the mold should not be fully closed until the sheet 16 has been heated to or above its yield temperature. The extent to which the mold may be closed is limited by the marginal edge portions 22 of the mold which serve as stops. As soon as the desired ribbed construction is imparted to the plate 16, the mold is opened as shown in Fig. 7 so that the ribbed separator may be removed therefrom.

It is important that as soon as the mold is opened and the plate 16 is removed that this embossed plate be cooled quickly below the yield temperature, for if the plate is not cooled quickly after the mold is opened, the embossed design may be partly lost by the return of the soft sheet 16 toward its original flat condition and the accuracy of the embossing operation thus reduced. This tendency of the hot plastic sheet to return towards its original flat condition can also be prevented by cooling the mold with the sheet 16 therein.

It is found when using a material such as microporous vulcanized hard rubber having a yield temperature below the boiling point of water, that wetting the plate 16 with water before it is introduced into the mold facilitates the molding operation by causing a rapid heat transfer from the mold to the sheet, and also helps to cool the plate quickly after it is removed from the mold. If, however, the plastic material used has a higher yield temperature than 212° F. then the wetting fluid used should have a higher boiling point than water, in this case glycerol or butyl alcohol (1-butanol) may be used.

It is important that the molding ribs 20 and corresponding depressions 21 be so shaped that when the mold is closed the softened sheet 16 will be distended in the rib areas so that the thickness of the sheet material in this area after such molding operation will not exceed the thickness of the flat web portion of the sheet 16 as will be apparent from Fig. 3 of the drawings. In fact the stretching or distending of the material to form the rib 13 reduces the thickness of this sheet material slightly in the rib as shown in Fig. 3. As a result of this construction the electrolytic conductivity of the separator will be very nearly uniform throughout all parts of the separator.

While the separator 10 has been above described as having the ribs formed therein by an embossing operation performed by the cooperating flat plates 17 and 18 of the mold, such ribs may be formed by passing the sheet 16 between rotating heated rolls formed with cooperating ribs and depressions, or by an extruding operation.

This separator can also be produced by a molding operation carried out in the mold 17, 18 or other type of mold, by introducing therein a shapeless mass capable of hardening to form a microporous separator, or a powder capable of being sintered to form a microporous separator. The plastic separator thus produced should have a yield temperature above 100° F.

It is possible by providing a microporous sheet 16 of rubber or plastic and then embossing the same in an accurately formed mold in accordance with the present invention, to form the ribs of the sheet with a high degree of accuracy so that the overall thickness of the separator will conform accurately to the desired dimensions, thus making it unnecessary to subject the separator to a grinding operation to bring the same accurately to size. After the embossed sheet 16 has been cooled below its yield temperature it will retain accurately its embossed shape so long as it is not again heated to its yield temperature.

Hard rubber used in making the separator of the present invention may be treated as disclosed in the Baty and Meyer Patent No. 2,329,322 to make it microporous. In which case the finished separator will contain a hydrous silica gel or the like as a pore-forming material, and preferably will have a porosity of over 40% as measured by a water displacement method.

A separator constructed as shown in Fig. 1 permits the electrolyte at the face of the positive plate to pass laterally from rib to rib through the passages 14, and the channels formed by the indentations corresponding to the ribs 13 facilitate the flow of the electrolyte at the face of the negative plate, and increase the space for the electrolyte at the face of the negative plate. Furthermore, while the hollow ribs 13 are capable of resisting considerable crushing pressure, they are more yieldable than solid ribs and will yield slightly under the pressure of the positive and negative plates when the battery parts fit unusually tight in a battery cell. This facilitates the assembly of these parts in the battery in snug-fitting relation to each other and prevents the separators and plates from vibrating in the battery.

The thickness of the microporous sheet 16 used to form the separator 10 may vary within a substantial range, a gage of .027" is considered good, and if this sheet is made as disclosed in the above cited Baty et al. patent or of a heat-softenable plastic it should when formed into the present separator be sufficiently non-brittle to handle well without cracking and stiff enough to be readily stuffed in between the battery plates.

The microporous sheet of vulcanized hard rubber or plastic material should have an impact strength of at least 0.8 ft. lb. per inch of notch as determined by the notched Izod test (ASTM D256–41T), and a brittleness consistent with the stiffness of the material so that the separator can be readily stuffed into a battery cell without breaking. The stiffness of the finished separator should be such that for a separator six inches square a compressive force of 7 ounces in a direction parallel to its length, or 4 ounces similarly applied to a side edge, at 80° F., will not bend the separator enough to shorten it more than ¼ of an inch.

The following is a list of heat softenable organic plastic materials that may be used to form the microporous battery separator of the present invention:

1. Vulcanized hard rubber (natural rubber)
2. Vulcanized hard rubber (synthetic rubber Buna S, Buna N)
3. Plasticized or non-plasticized—plastics
    (a) Polystyrenes (Polyfibre, Lustron, Styron, #18 Styramic, Styramic HT, Cerex)
    (b) Polyacrylates (Lucite, polymethylmethacrylate)

(c) Polyvinylidenes (Geon, Saran)
(d) Polyvinyls (Polyvinyl Chloride, Vinylites)
(e) Polyamides (nylon)

The plasticized or non-plasticized—plastics are preferably fiberized and collected in a batt or mat and then sintered at such pressure and temperature as to form a microporous sheet having a porosity greater than 40% and the other physical properties above described as necessary for the battery separator herein contemplated. The porosity of such a sheet can be controlled by the diameter or angular disposition of the filaments in the sheet and pressure and heat used to unite them. A microporous sheet of these plastics may also be formed by sintering small particles thereof under proper conditions.

Since, when rubber is used, the present invention contemplates vulcanizing the sheet 16 before the ribs are formed thereupon, it is a simple matter to wind long lengths of the sheet 16 or wider widths of the same onto a drum with a liner cloth and vulcanize a large quantity of the sheet, whereupon it may be cut into the strips 16 ready for the embossing or rib-forming operation which may be formed upon a long strip. The embossed strip may then be cut into the desired lengths for battery separators. This completes the operation of forming such separator except possibly for trimming the side edges adjacent the ribs 11 to bring the separator accurately to the desired dimensions.

It will be apparent from the foregoing that we have developed a simple and inexpensive microporous battery separator having ribs which are so formed that the electrolytic conductivity of the separator will be very nearly uniform throughout its entire area, and which separator is sufficiently non-brittle to handle well without breaking while it has sufficient stiffness to be readily stuffed into a battery cell.

Having thus described our invention, what we claim and desire to protect by Letters Patent is:

1. A battery separator that can be freely handled without breaking and capable of giving good service in a battery, comprising a microporous sheet of heat-softenable organic plastic composition provided with rows of raised distended ribs upon one face with corresponding indentations at the other face whereby hollow ribs are formed and all portions of the separator have approximately the same electrolytic conductivity, and said rows terminating short of the ends of the separator to lessen the tendency of such ends to crack.

2. A battery separator that can be freely handled without breaking and is stiff enough to be readily stuffed into place in a battery cell and is capable of giving good service in a battery, comprising an embossed single-ply microporous sheet of heat-softenable organic plastic composition provided with raised distended ribs upon one face with corresponding indentations at the other face whereby hollow ribs are formed and all portions of the separator have approximately the same electrolytic conductivity, and said ribs being lower in height for a substantial distance near an end of the separator and tapered from one height which is greatest at the central portion of the separator to the other and also formed so that they terminate before they reach said end to make the separator easy to stuff into place in a battery cell.

3. A battery separator that can be freely handled without breaking and capable of giving good service in a battery, comprising a microporous sheet of vulcanized hard rubber provided with rows of raised distended ribs upon one face with corresponding indentations at the other face whereby hollow ribs are formed and all portions of the separator have approximately the same electrolytic conductivity, and said rows terminating short of the ends of the separator to lessen the tendency of such ends to crack.

4. A battery separator that can be freely handled without breaking and is capable of giving good service in a battery, comprising an embossed single-ply sheet formed of a microporous composition selected from the group consisting of vulcanized hard rubbers, polystyrenes, polyacrylates, poly vinylidenes, polyvinyls and poly amides, and provided with rows of raised distended ribs upon one face with corresponding indentations at the other face whereby hollow ribs are formed that terminate short of the ends of the separator and all portions of the separator have approximately the same electrolytic conductivity.

5. A battery separator comprising a microporous sheet that is constructed throughout of stiff heat-softenable organic plastic composition having a yield temperature greater than 100° F. and having raised distended ribs upon one face and corresponding indentations at the other face so that the thickness of the material of these ribs does not exceed the thickness of the non-ribbed portion of the sheet and the electrolytic conductivity is nearly uniform throughout all parts of the sheet having this construction, the major portion of the sheet being provided with rows of non-continuous aligned ribs that terminate short of the ends of the separator.

6. A battery separator comprising a microporous sheet that is constructed throughout of stiff heat-softenable organic plastic composition having a yield temperature greater than 100° F. and having raised distended ribs upon one face and corresponding indentations at the other face so that the thickness of the material of these ribs does not exceed the thickness of the non-ribbed portion of the sheet and the electrolytic conductivity is very nearly uniform throughout all parts of the sheet, the marginal side edge portions of the sheet being provided with ribs having laterally extending spaced U-shaped portions that stiffens the sheet transversely and the rest of the separator being provided with rows of non-continuous aligned ribs that terminate short of each end of the separator.

7. A battery separator that can be freely handled without breaking and is stiff enough to be readily stuffed into place in a battery cell and is capable of giving good service in a battery, comprising an embossed single-ply microporous sheet that is constructed throughout of vulcanized hard rubber having a porosity of over 40%, and provided with rows of raised distended ribs upon one face only with corresponding indentations at the other face, and said ribs being lower in height for a substantial distance near an end of the separator and tapered from one height which is greatest at the central portion of the separator to the other to make this end of the separator easier to stuff into place in a battery cell.

SHERMAN I. STRICKHOUSER.
EDWIN C. UHLIG.

(References on following page)

REFERENCES CITED

The following references are of record in the file of this patent:

UNITED STATES PATENTS

| Number | Name | Date |
|---|---|---|
| 1,357,378 | Boyer | Nov. 2, 1920 |
| 1,432,938 | Wood et al. | Oct. 24, 1922 |
| 1,529,839 | Lunn | Mar. 17, 1925 |
| 1,651,567 | Wilderman | Dec. 6, 1927 |
| 2,004,304 | Wells | June 11, 1935 |
| 2,117,382 | Wells | May 17, 1938 |
| 2,176,427 | Kershaw | Oct. 17, 1939 |
| 2,181,891 | Hazell | Dec. 5, 1939 |
| 2,297,248 | Rudolph | Sept. 29, 1942 |
| 2,302,833 | Behrman | Nov. 24, 1942 |
| 2,329,322 | Baty et al. | Sept. 14, 1943 |
| 2,335,757 | Hall | Nov. 30, 1943 |
| 2,382,829 | Strickhouser et al. | Aug. 14, 1945 |

FOREIGN PATENTS

| Number | Country | Date |
|---|---|---|
| 470,561 | Great Britain | Aug. 17, 1937 |

OTHER REFERENCES

Rupp, J. L., Electrical Engineering, Transactions section, November, 1944, page 774.